Patented Sept. 29, 1953

2,653,918

UNITED STATES PATENT OFFICE 2,653,918

ADDITION OF ALKALI-METAL SILICO-FLUORIDES TO LATEX

Charles F. Eckert, Westwood, N. J., assignor to United States Rubber Company, New York, N. Y., a corporation of New Jersey No Drawing. Application February 24, 1951, Serial No. 212,688

8 Claims. (Cl. 260—2.5)

This invention relates to the addition of alkali-metal silicofluorides to latex.

The use of alkali-metal silicofluoride as a gelling agent for latex in latex dipping, molding and foam sponge processes is well known. Generally, an aqueous suspension or paste of the alkali-metal silicofluoride is mixed with the liquid latex, or if desired with the latex foam in sponge manfacture, and the thus compounded latex is shaped with or without foaming or the foam containing the alkali-metal silicofluoride is shaped, after which the final shaped latex article is gelled by heating, cured and dried. The gelling or coagulation of alkaline latex by means of alkali-metal silicofluoride is the result of the progressive solution and hydrolysis of the slightly soluble alkali-metal silicofluoride, with the consequent liberation of hydrogen ions, which reduces the pH of the latex sufficiently to cause gelling of the same. Alkali-metal silicofluorides, in aqueous dispersion, reach equilibrium by the law of mass action according to the following equation:

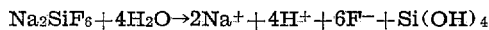

$$Na_2SiF_6 + 4H_2O \rightarrow 2Na^+ + 4H^+ + 6F^- + Si(OH)_4$$

The pH of an unmodified aqueous suspension of alkali-metal silicofluoride is low, about 3.5. When such aqueous silicofluoride suspensions are admixed in an alkaline medium, the pH of the alkaline medium drops rapidly to an equilibrium value near 7. Thus when an aqueous suspension of alkali-metal silicofluoride is added to an alkaline latex, local coagulation tends to take place, the latex rapidly becomes unstable and thickened at room temperature, and may prematurely gel without allowing adequate time for the manipulative operations of dipping, molding, foaming and the like.

According to the present invention, alkaline latex is made heat-sensitive by the addition of alkali-metal silicofluoride while maintaining stability at room temperature for sufficient time to form the latex articles, as by dipping, molding, foaming, etc., without premature gelling. Further, the viscosity of the heat-sensitized latex remains substantially unchanged until coagulation commences.

I have discovered that diethyleneglycol monooleate containing some free oleic acid interferes with the establishment of the usual equilibrium of silicofluoride dispersions and causes a great retardation in the rate of decomposition of the silicofluorides when they are dispersed in an alkaline medium, e. g., alkaline latex. The pH of a paste comprising an alkali-metal silicofluoride and a mixture of diethyleneglycol monooleate and oleic acid changes very little after it has stood for as long as twenty-four hours at room temperature, but when the temperature of the treated paste is raised the pH falls off rapidly. Alkali-metal silicofluoride treated with a mixture of diethyleneglycol monooleate and oleic acid is rendered substantially unreactive with alkali over a considerable period of time at room temperature. This is illustrated in Example I. The compounding of latex with the alkali-metal silicofluoride suspensions of the present invention is illustrated in Examples II and III. All parts and percentages referred to herein are by weight.

Example I

One hundred grams of a 50% paste of $Na_2SiF_6$ with water are mixed with 10 grams of a mixture of 61% diethyleneglycol monooleate and 39% oleic acid to form the treated paste. A similar paste containing no diethyleneglycol monooleate and oleic acid is also prepared. Four grams of 20% aqueous NaOH are then added to each of the pastes, and their pH measured over a period of time. The results are shown below:

| Treated Paste | | Untreated Paste | |
|---|---|---|---|
| Time | pH | Time | pH |
| 0 | 13 | 0 | 13 |
| 15 min | 13 | 5 min | 13 |
| 2 hours | 11.71 | 10 min | 12.4 |
| 3 hours | 11.36 | 15 min | 7.71 |
| 1 day | 9.92 | 25 min | 7.71 |
| 6 days | 8.15 | | |
| 13 days | 7.55 | | |

It may be noted from this table that the neutralization of the NaOH with the treated paste proceeds very slowly, the pH of the mixture falling only to about 10 after one day, whereas the neutralization of the NaOH with the untreated paste proceeds relatively rapidly, the pH of this mixture falling to 7.7 within fifteen minutes. The amount of $Na_2SiF_6$ present in both these pastes is greatly in excess (50-fold) of the amount necessary to neutralize all of the NaOH.

Although the pH of the treated paste gradually drops to about 7.7 after the paste has stood for 13 days, the inhibiting action of the diethyleneglycol monooleate and oleic acid on the silicofluoride reactivity remains. If the rate of neutralization of 100 ml. of 0.1-N NaOH by 1 ml. of each of the treated and untreated pastes is tested, it is found that the hydroxyl ion is neutralized rapidly (in ca. 90 seconds) by the untreated paste, whereas very little change in pH occurs within 15 minutes with the treated paste.

The effect of temperature on the treated paste is shown in the following table. One and one-half gram samples of the 13-day-old paste, treated above, are heated to various temperatures in the presence of 100 ml. of 0.1-N NaOH and the time for the pH to reach the phenolphthalein end point (ca. pH 8) was noted. The results are shown below:

| Temperature | Time of Heating |
|---|---|
| 75° C | 3 min. |
| 70° C | Do. |
| 60° C | 7 min. |
| 55° C | 28 min. |
| 50° C | 20 hours. |

It will be apparent from this table that the reactivity of the silicofluoride, as indicated by the rate of pH drop, increases sharply when the temperature reaches 60° C. It also shows that the treated paste remains heat-sensitive after it has stood for as long as 13 days.

I have found that at least 5% by weight of oleic acid based on the diethyleneglycol monooleate must be present in the treated alkali-metal silicofluoride paste according to the present invention in order to obtain the effects of the present invention. When smaller amounts of oleic acid are present the silicofluoride reacts readily with hydroxyl ions. Larger amounts of oleic acid up to 65% or more based on the diethyleneglycol monooleate may be used. The upper range of oleic acid is not critical. The amount of diethyleneglycol monooleate is generally from 10% to 100% based on the alkali-metal silicofluoride. The alkali-metal silicofluoride concentration in the aqueous suspension or paste is generally from 1% to 50%. The amount of alkali-metal silicofluoride to heat-sensitize latices is generally from 0.5% to 15% based on the latex solids. The effects of the present invention are not obtainable with pastes consisting solely of either diethyleneglycol monooleate and silicofluoride or of oleic acid and silicofluoride. Moreover, other common surface-active agents, e. g., ethyleneglycol laurate, polyethyleneglycol laurate, ethyleneglycol stearate, polyethyleneglycol stearate, diethyleneglycol monostearate, ethyleneglycol monooleate, nonaethyleneglycol monooleate, etc., do not give the effects of the present invention when admixed with silicofluoride and oleic acid in place of the diethyleneglycol oleate.

The compounding of latices with the alkali-metal silicofluoride pastes of the present invention in the preparation of heat-sensitive latex compounds for dipped or molded or foam sponge articles is illustrated in Examples II and III.

*Example II*

Fifty parts of $Na_2SiF_6$ are mixed with 50 parts of water and 10 parts of a mixture consisting of 61% diethyleneglycol monooleate and 39% of free oleic acid. The resultant paste is made alkaline by adding 0.8 part of NaOH (as 20% aqueous solution). The pH of the newly prepared paste is 12.85; after 20 hours its pH is 11.2.

A natural rubber latex preserved with 1.2% ammonia and having a solids content of 67.5% is then compounded with the following ingredients in the proportions indicated:

| | Wet Weight | Dry Weight |
|---|---|---|
| Latex | 148 | 100 |
| Water | 20 | |
| Curative paste (55% solids) | 15 | |
| Sulfur | | 1.5 |
| Accelerator | | 2.0 |
| ZnO | | 5.0 |
| Antioxidant | 1.8 | 1.0 |
| 20-hr.-old treated $Na_2SiF_6$ | 2.9 | 1.45 |

The stability at room temperature, as indicated by the pH, and the heat sensitivity of this compound as measured by the time to coagulate portions at 50° C. after various periods of standing, are shown in the following table:

| Elapsed Time at Room Temperature | pH | Time to Coagulate at 50° C., min. |
|---|---|---|
| 10 min | 9.50 | 7.1 |
| 60 min | 9.42 | 2.4 |
| 120 min | 9.40 | 1.1 |

There are many synthetic detergents which have advantages over conventional alkali-metal soaps of fatty acids and rosin acids which are used as frothing agents for latex and also as emulsifying agents in the manufacture of synthetic rubber latices, but when these detergents are substituted for the conventional soaps in a silicofluoride-sensitized latex the froth coagulates before it can be poured into the molds. Example III shows the coagulation time of latex froth whipped from the latex compound of Example II in a Hobart mixer, with ordinary sodium silicofluoride and with sodium silicofluoride treated according to the present invention as in Example II, when some of these detergents are added as the frothing agents. It is readily apparent that when the treated paste according to the present invention is used, the coagulation time of the latex froth is considerably lengthened.

*Example III*

| | Coagulation Time, min. | |
|---|---|---|
| | Ordinary $Na_2SiF_6$ | Treated $Na_2SiF_6$ |
| Diamyl sodium sulfosuccinate | 1.5 | 8 |
| Dihexyl sodium sulfosuccinate | 1.0 | 12 |
| Isopropylnaphthylene sodium sulfonate | 1.0 | 12 |
| Monobutylphenylphenol sodium monosulfonate | 1.5 | 8.5 |
| Monobutylbiphenyl sodium monosulfonate | 1.5 | 7–10 |
| Sodium cetyl sulfate | 1.0 | 8–17 |

The fully compounded latices have ca. 58% solids and contain from 0.5 to 2.8% of the detergent based on the solids in the latex. Two percent based on the solids in the latex of the ordinary sodium silicofluoride and of the treated sodium silicofluoride, respectively, is added to different portions of each froth.

The advantages inherent in the use of the treated paste of the present invention are also present when other means of frothing the latex, e. g., chemical means, are employed. For example, if sodium cetyl sulfate is substituted for conventional soaps in a hydrogen peroxide blown latex foam containing untreated sodium silicofluoride, the latex foam coagulates before blowing is complete and a torn, uneven, cellular structure results, whereas when the treated paste of the present invention is used in a similar compound, blowing goes to completion before coagulation occurs and an even, cellular product is obtained.

While Examples II and III illustrate the present invention with natural rubber latex, the invention is equally applicable to the heat-sensitizing of alkaline synthetic rubber latices with alkali-metal silicofluorides. Such synthetic rubber latex may be an aqueous emulsion polymerizate of one or a mixture of butadienes-1,3, for example, butadiene-1,3, 2-methyl butadiene-1,3 (isoprene), piperylene, 2,3-dimethyl butadiene-1,3. The polymerizable material in the preparation of the synthetic rubber latex, as is known, may be a mixture of one or more of such butadienes-1,3 with one or more other polymerizable compounds which are capable of forming rubbery copolymers with butadienes-1,3, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylamide; methyl vinyl ether; methyl vinyl ketone; vinylidene chloride.

While the use of alkali-metal silicofluoride aqeous suspensions containing diethyleneglycol monooleate and oleic acid is particularly adapted to latex processes as illustrated in Examples II and III, such suspensions or pastes of alkali-metal silicofluoride are adaptable to a variety of other applications unrelated to latex. For example, alkali-metal silicofluorides have been proposed as insecticides. The principal difficulty encountered in their use for this purpose is the damage to foliage due to the low pH of the silicofluoride. An aqeous spray made by diluting an aqueous paste of alkali-metal silicofluoride containing diethyleneglycol monooleate and oleic acid, with or without the addition of alkaline material, is a solution of the difficulty. The maintaining of a high pH of an aqueous suspension of alkali-metal silicofluoride containing diethyleneglycol monooleate and oleic acid in the absence of added alkaline material is shown in Example IV below.

*Example IV*

Fifty grams of dry sodium silicofluoride were mixed with 10 grams of a 61% diethyleneglycol monooleate-39% oleic acid mixture and 50 grams of distilled water. The pH of the resultant paste was found to be 6.2 and remained the same over a period of twenty-four hours. The pH of the silicofluoride alone was 3.5. The pH of the diethyleneglycol monooleate-oleic acid mixture alone was 7.05. Since the pH of the paste was well above that of the silicofluoride and remained well above it for a considerable period of time, it is evident that the hydrolysis of the silicofluoride was inhibited by the ethyleneglycol monooleate and oleic acid.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. An aqueous suspension of alkali-metal silicofluoride containing 10 to 100 parts of diethyleneglycol monooleate per 100 parts of alkali-metal silicofluoride and 5 to 65 parts of oleic acid per 100 parts of diethylene glycol monooleate.

2. An aqueous suspension of sodium silicofluoride containing 10 to 100 parts of diethyleneglycol monooleate per 100 parts of sodium silicofluoride and 5 to 65 parts of oleic acid per 100 parts of diethylene glycol monooleate, said silicofluoride suspension having a pH in the range of 6.2 to 13.

3. An alkaline latex admixed with an aqueous suspension containing 0.5 to 15 parts of alkali-metal silicofluoride per 100 parts of latex solids, 10 to 100 parts of diethyleneglycol monooleate per 100 parts of alkali-metal silicofluoride and 5 to 65 parts of oleic acid per 100 parts of diethylene glycol monooleate.

4. An alkaline latex admixed with an aqueous suspension containing 0.5 to 15 parts of sodium silicofluoride per 100 parts of latex solids, 10 to 100 parts of diethyleneglycol monooleate per 100 parts of sodium silicofluoride and 5 to 65 parts of oleic acid per 100 parts of diethylene glycol monooleate, said silicofluoride suspension having a pH in the range of 6.2 to 13.

5. A foam of an alkali latex composition admixed with an aqueous suspension containing 0.5 to 15 parts of alkali-metal silicofluoride per 100 parts of latex solids, 10 to 100 parts of diethyleneglycol monooleate per 100 parts of alkali-metal silicofluoride and 5 to 65 parts of oleic acid per 100 parts of diethylene glycol monooleate.

6. A foam of an alkali latex composition admixed with an aqueous suspension containing 0.5 to 15 parts of sodium silicofluoride per 100 parts of latex solids, 10 to 100 parts of diethyleneglycol monooleate per 100 parts of sodium silicofluoride and 5 to 65 parts of oleic acid per 100 parts of diethylene glycol monooleate.

7. A method of heat-sensitizing an alkaline latex by the addition of an alkali-metal silicofluoride which comprises mixing with an alkaline latex an aqueous suspension containing 0.5 to 15 parts of alkali-metal silicofluoride per 100 parts of latex solids, 10 to 100 parts of diethylene glycol monooleate per 100 parts of alkali-metal silicofluoride and 5 to 65 parts of oleic acid per 100 parts of diethyleneglycol monooleate.

8. A method of heat-sensitizing an alkaline latex by the addition of a sodium silicofluoride which comprises mixing with an alkaline latex an aqueous suspension containing 0.5 to 15 parts of sodium silicofluoride per 100 parts of latex solids, 10 to 100 parts of diethylene glycol monooleate per 100 parts of sodium silicofluoride and 5 to 65 parts of oleic acid per 100 parts of diethyleneglycol monooleate, said silicofluoride suspension having a pH in the range of 6.2 to 13.

CHARLES F. ECKERT.

References Cited in the file of this patent

UNITED STATES PATENTS

| Number | Name | Date |
|---|---|---|
| 1,617,708 | Gehauf et al. | Feb. 15, 1927 |
| 2,127,252 | Fischer | Aug. 16, 1938 |
| 2,319,885 | Robats | May 25, 1943 |
| 2,444,869 | Clayton et al. | July 6, 1948 |
| 2,512,475 | Bau | June 20, 1950 |
| 2,586,275 | Toulmin | Feb. 19, 1952 |